Jan. 31, 1950  W. W. RANSOM  2,495,764
APPARATUS FOR REMOVING RUBBER AND THE
LIKE FROM BODIES TO WHICH AFFIXED
Filed March 15, 1946  2 Sheets-Sheet 1
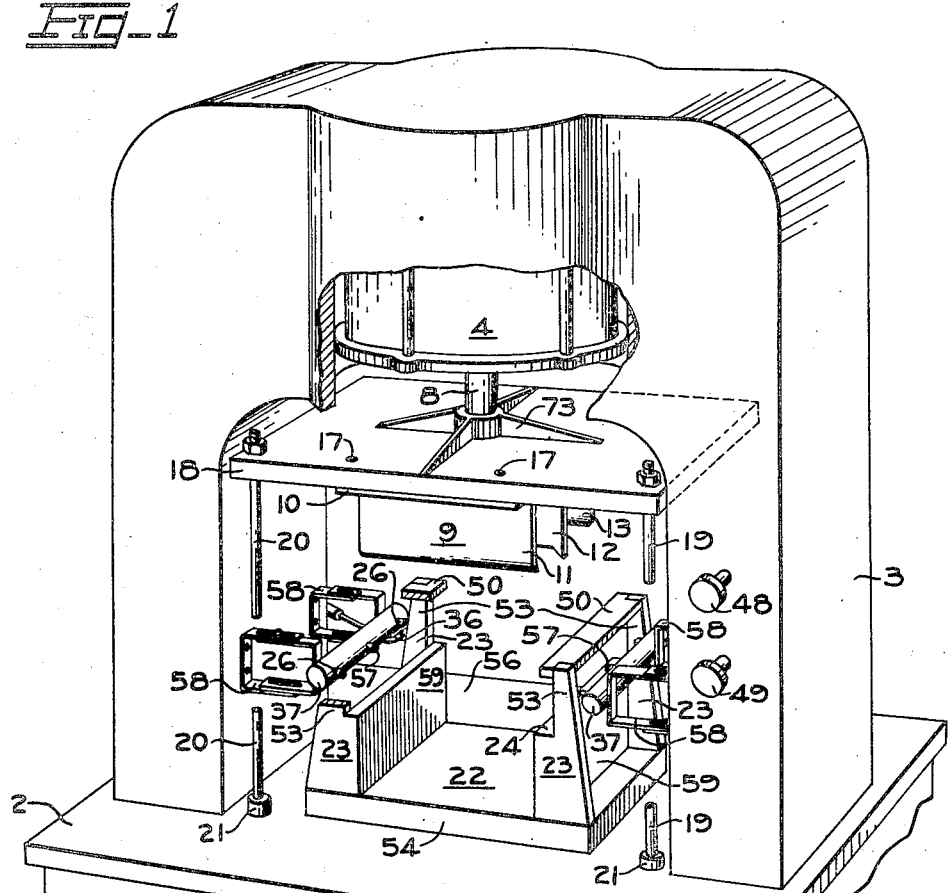
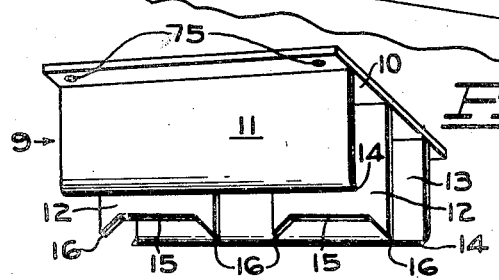
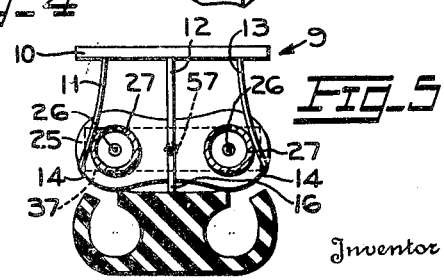
Inventor
Walter W. Ransom
By J. H. Church & H. E. Thibodeau
Attorneys

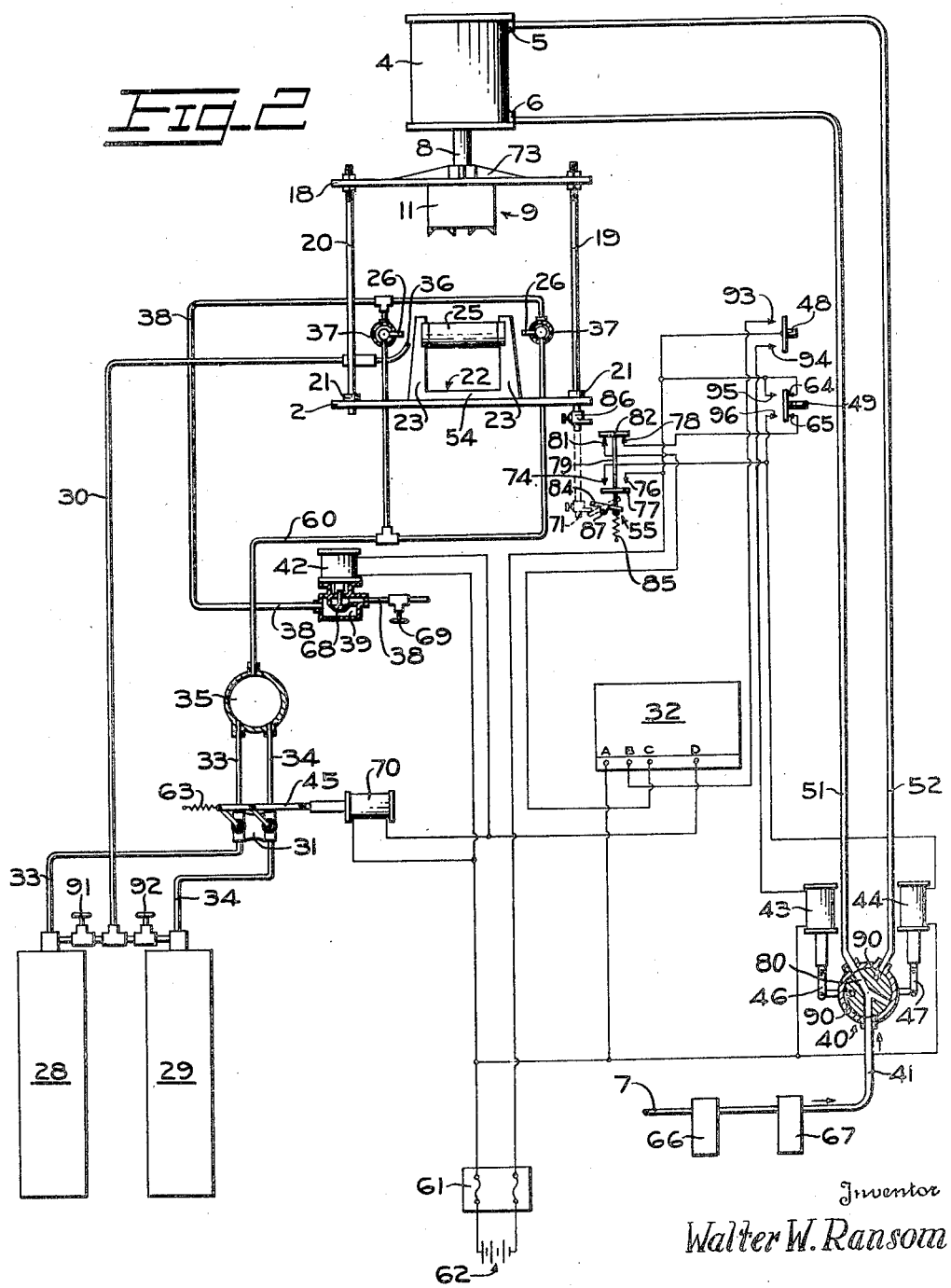

UNITED STATES PATENT OFFICE 2,495,764

APPARATUS FOR REMOVING RUBBER AND THE LIKE FROM BODIES TO WHICH AFFIXED

Walter W. Ransom, Moline, Ill.

Application March 15, 1946, Serial No. 654,786

13 Claims. (Cl. 164—34)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates generally to the art of removing worn rubber and the like from bodies of metal and other material to which it has been vulcanized, or otherwise affixed, and comprises a simple, efficient, speedy and economical apparatus therefor.

More particularly my invention provides mechanism for removing rubber, or similar material, which has been secured to track links, and other supporting bodies forming a part of vehicles having caterpillar traction means such as tanks, half-track conveyances, carriers, tractors and the like.

Specifically I have provided among other things completely automatic means for removing worn rubber from a track link, by the application of suitable heat for loosening the bonded material, and cutting force and pressure exerted against the rubber by a punch or similar instrument.

In the past it has usually been the practice to remove vulcanized rubber from track links and other supporting bodies by means of hand operated tools designed for cutting, pressing and prying the material from a body to which it had adhered, after first subjecting the material to heat applied by torches or other means. Due to the tenacity with which vulcanized rubber and analogous substances cling to a body to which they have been attached, this method of removal was slow and expensive, due to the time element involved in performing the work manually. Consequently the quantity of track links that could be processed in an average work day was limited and depended upon the number of workers employed for that purpose and upon their physical ability and capacity for work. Accordingly the need for automatic apparatus which would accelerate the work and correspondingly increase production, constituted a substantial problem.

Accordingly a principal object of the present invention is the production of improved means including completely automatic apparatus for economically removing rubber and the like from bodies to which it has been attached.

Another object of my invention is the inclusion in apparatus of the class described of means for loosening and rendering plastic rubber and other materials that are to be removed from supporting substructure.

A further and important object of the present invention is the construction and arrangement of means adapted to automatically return the apparatus to its starting position and to set it for another cycle of operation upon completion of the removal of adhesive material from a body to which it has been affixed.

A further object of my invention is the provision of valve structure in apparatus of the class described which will effect substantially simultaneous application of heat, cutting force and pressure to rubber and the like for its removal from bodies to which it has been bonded.

Another object of my invention is the inclusion in rubber removing apparatus of emergency means for stopping the removing mechanism at any time during the cycle of operation and returning it to starting position.

A further object of my invention is the provision of cooling facilities for heat conducting means in apparatus of the class described.

A preferred embodiment of my invention wherein I attain the above and other objects is shown in the accompanying drawings in which like numerals refer to like parts throughout the several views and wherein;

Fig. 1 is a perspective view of a complete machine constructed according to my invention;

Fig. 2 is a diagrammatic representation of the electrical control system including a timer;

Fig. 3 is a perspective view of a worn track shoe and a supporting track link;

Fig. 4 shows in perspective the cutting and pressing punch used for removal of worn rubber from a track link; and Fig. 5 is a sectional view of a track link and indicates the manner in which the punch removes a worn shoe therefrom.

Referring to Fig. 1, for the purpose of illustration, the apparatus is shown as comprising a base 1 on which is mounted a table 2, to which is secured a generally arch-shaped housing 3. Within the upper part of the housing 3 is a cylinder 4 of the double-acting type equipped with ports 5 and 6 (Fig. 2) for the intake of fluid pressure, such as compressed air, secured from any suitable source, indicated by the numeral 7, for reciprocation of a piston (not shown) within the cylinder. Air pressure admitted to the cylinder through the port 5 forces the piston down in the cylinder and the motion of the piston is reversed by the action of air pressure admitted to the cylinder 4 through the port 6. The supply of fluid pressure to the cylinder 4 is controlled by an electrically operated valve 40, energized by power from a source 62, and operated in a manner to be hereinafter described.

A ram 8 has one of its ends attached to the piston, while its other end is secured to a punch, indicated generally by the numeral 9. The punch may be generally rectangular in cross section and, as shown in Fig. 3, may comprise a head 10, to the underside of which is secured a plurality of spaced apart longitudinally extending webs 11, 12 and 13. The outer webs 11 and 13 are preferably made in one piece and of flexible stock such as spring metal. The central web 12 may be divided into two or more sections (two in the present instance). The outer sides of each of the webs 11 and 13 are somewhat concave in configuration and terminate in an inwardly extending sharpened point as at 14. The inner edges of the webs 11 and 13 are sharpened substantially coextensive with their length to increase the cutting action of the punch. (See Fig. 5). The central web sections 12 may be formed with relatively straight sides recessed on their under portion, as at 15, to form a projection 16 at each end of the web sections, adapted to exert pressure against adhesive material to be removed from a track link. To the punch head 10 is secured, by any suitable means such as bolts 17, adapted to be inserted in suitable apertures 75 in the punch head 10, a crosshead 18. The crosshead has a centrally formed aperture through which the ram 8 extends to form a connection with the head 10 of the punch 9 and has an integral coupling member 73 which connects it to the ram. To the crosshead 18, at opposite sides thereof, are secured two guide rods, 19 and 20, each of which is threaded at its upper end for the reception of a suitable nut for securing it to the crosshead 18, as shown in Fig. 1. The other ends of the guide rods 19 and 20 extend through bushings in the table 2, as at 21. The rods reciprocate through the bushings without contact with the base 1, through an interior passageway formed adjacent the lateral and front walls of the base. The rods are adapted to substantially prevent the ram assembly from turning by use of the bushings. Disposed beneath the punch 9 and rigidly mounted on the table 2 is a track link holder, indicated generally by the numeral 22 and comprising a base 54 having four brackets 23 at opposite sides and ends thereof, two sidewalls 59 and a rear wall 56. The brackets 23 are recessed intermediate their top and bottom, as at 24, to provide a supporting shelf for a track link 25 (Fig. 1). Each of the brackets 23 has an extension 53 which supports one end of an elongated rectangular member 50 spaced apart from the shelf 24 and substantially parallel thereto. The purpose of the two members 50 will be hereinafter explained. In Fig. 1 the front left bracket 53 is broken away to disclose underlying structure.

The means for heating the worn rubber to be separated from a track link comprises two pairs of symmetrically disposed gas jets 26 adapted to project heat into two tubes 27 at each end of the track link 25 when it is positioned in the holder 22. A supplementary jet 57, intermediate each pair of jets 26 supplies extra heat to each link end, which in some cases is required for the removal of worn rubber from a link. Gases for the jets 26 and 57 are obtained from a suitable source such as the tanks 28 and 29, the supply of fuel being regulated by an electrically operated dual valve 31 hereinafter to be described.

The tanks 28 and 29 are adapted to contain gases, such as oxygen and acetylene, which are passed through conduits 33 and 34 from the tanks to a mixing chamber 35, from which they are conveyed to the jets 26 and 57 through the conduit 60. Ignition of the gases is obtained through the medium of a pilot 36, shown in Figs. 1 and 2, and supplied through a conduit 30 with a mixture of gases stored in the tanks 28 and 29, the supply of the gases being controlled by conventional gate valves 91 and 92.

The gas jets 26 and 57 are cooled by a fluid, such as water, drawn through a conventional gate valve 69 and obtained from a source (not shown). The water is circulated in jackets 37, which are supported by brackets 58, secured to the inner side walls of the housing 3. The water is conveyed to the jackets through a conduit 38, connected to the valve 69 and the supply of the coolant flowing to the jackets is controlled by an electrically operated valve 39 interposed in the conduit 38, between the valve 69 and the jackets 37. A suitable drain (not shown) is provided for disposal of the cooling fluid after it has been circulated through the jackets 37.

Operation of the apparatus is initiated by an electrical circuit under the control of a starting switch 48 mounted on the housing 3. An emergency switch 49, also mounted on the housing 3, is provided for stopping the apparatus and returning it to starting position should necessity require. A limit switch, indicated generally by the numeral 55, (shown in Fig. 2) and connected to the source of electrical energy 62, is adapted to shut off the supply of gas and water and to return the piston to its starting position at the end of the removal operation, in a manner hereinafter to be explained. This limit switch may be mounted on an interior side wall of the base 1 to position it in the path of travel of the guide rod 19 as the latter moves down through the bushing 21. The path of the rod 19 below the table 2 and during the reciprocatory movement of the piston is shown in Fig. 2 in dotted lines, as at 71. The switch 55 is actuated to the "on" position by a dog 86, positioned on the guide rod 19, as the dog engages an operating lever 84 of the switch 55 at substantially the limit of downward travel of the rod 19. The switch 55 is snapped off through the action of a tension spring 85, anchored at one end to the lever 84 and secured at the other end to the base 1. The switch is returned to its "off" position following the release of pressure on the lever 84, as will more fully hereinafter appear.

The three valves 31, 39 and 40, control the supply of gas, water and air respectively, and are electrically operated substantially simultaneously, through the instrumentality of the starter switch 48 and a timer 32. The air valve 40 is actuated by solenoids 43 and 44. The gas valve 31, which is of the dual type, is of unitary construction and is operated by the solenoid 70, and the water valve 39 is actuated by the solenoid 42. All solenoids are connected to the source of electrical energy 62 through a fuse box 61, and are adapted to bias the intake ports of the air, gas and water valves respectively into registry with the sources of air, gas and water, with the conduits 51 and 52, leading to the cylinder 4, with the conduits 33 and 34, leading to the gas mixing chamber 35, and with the conduit 38, extending to the water jackets 37 and to the water source. The rotation of the intake and exhaust ports of the air valve 40 is accomplished by the action of solenoid rods 46 and 47, which are reciprocated by the solenoids 43 and 44 respectively when they are electrically energized, in a conventional manner well understood in the art. The gas and water valves 31 and 39 (Fig. 2) are opened by energizing of the solenoids 70 and 42 through the medium of the solenoid rod 45 and the valve head 68, respectively, and are closed by the action of a suitable spring, such as 63, shown for the gas valve, that employed in the water valve 39 not being illustrated.

Preferably the air is passed through a dehydrating apparatus 66 and then to a lubricator 67 in order to prevent the piston in the cylinder 4 from becoming rusted.

The electrical operation of the device is as follows:

The timer 32, connected to the source of electrical energy 62, controls the automatic functioning of the apparatus. It is of conventional construction and requires only a momentary closing of a circuit to start a predetermined time cycle. In the present instance this circuit is closed by manual pressure on the starter button of the switch 48, which bridges the gap between contact points 93 and 94 of the switch. As pressure on the button is released the starting circuit is broken and the timer operates independently of the switch 48. The electrical energy utilized is obtained through the fuse box 61, leading to the power source 62. Preferably the time cycle is adjustable and may be set for a suitable duration required to secure the removal of worn rubber from a track link. In some cases for example, satisfactory results have been obtained by allowing an operative interval of approximately 80 seconds. At the end of this time the apparatus is rendered inoperative by the autimatic closing of the gas and water valves and the return of the piston to starting position, unless this has been sooner accomplished by functioning of the emergency switch 49 or of the limit switch 55, in a manner hereinafter to be explained. At the instant of closing the starting circuit, suitable means, such as a solenoid within the timer, functions through the connection B on the timer, to close a second or holding circuit, represented by A and C on the timer, the connection B serving as a pilot relay for maintaining the circuit to the timer motor independently of the starter switch 48. The switch B controls a temporary line leading to the starter switch 48 and is dead after initial pressure on the switch 48 is released.

A third circuit, through the connection D on the timer 32, is closed in response to completion of the circuit through A and C on the timer. The closing of the third circuit through D simultaneously energizes the solenoid 70, for operating the dual gas valve 31, and the solenoid 42, which actuates the water valve 39. Completion of the timer circuits as above described supplies the gas and water which are essential to the functioning of the apparatus.

In the operation of the air valve 40 the solenoid 43 controls the flow of air through the port 5 into the cylinder 4 for forcing the piston down within the cylinder. The solenoid 43 is energized by pressure on the switch 48, the point 94 of which is connected to the solenoid, while the point 93 of the switch 48 is connected to the switch B of the timer. The other side of the solenoid 43 is connected to the power source 62, as is also the button of the switch 48. Energizing of the solenoid 43, by pressure on the starter switch 48, rotates the air valve 40 in a clockwise direction, thereby moving the intake port 80 of the valve 40 out of registry with the conduit 51, which was its position after completion of the rubber separation, and into registry with the conduit 52, which leads to the upper port 5 of the cylinder 4. Air may then be conveyed through the conduit 41 and the valve 40 through the port 5 to the interior of the cylinder 4 at a point adjacent the top thereof and above the piston. This forces the piston down in the cylinder, thereby bringing the punch 9 into forcible contact with the worn rubber on the track link 25, positioned in the holder 22. The conduit 51 provides a passage for air flowing to the bottom of the cylinder 4 through the port 6 after worn rubber has been removed from a track link. Air is supplied in a manner hereinafter to be described. Admission of air to the cylinder 4 through the port 6 at a point below the terminus of downward travel of the piston during its reciprocation in the cylinder, forces the piston up in the cylinder to the point it occupied before the start of the rubber removing operation, where it is held by the air pressure below the piston until the device is again started by pressure on the switch 48.

The air valve 40 is equipped with two exhaust ports 90, through which air which has been utilized for actuation of the piston within the cylinder 4 is passed from the conduits 51 and 52 to the atmosphere. For example, when the intake port 80 of the valve 40 is in registry with the conduit 52, the exhaust port 90 positioned at the left of the valve 40, as viewed in Fig. 2, is in registry with the conduit 51, and when the piston is forced down in the cylinder 4 by the air pressure conveyed through the conduit 52 and the port 5, the piston expels the air at the bottom of cylinder 4 through the port 6 and conduit 51, where it ultimately comes in contact with the exhaust port 90 which is in registry with the conduit 51, and the air is thus passed out of the apparatus by means of the exhaust port 90. Similarly exhaust port 90 shown at the right of the valve 40, as viewed in Fig. 2, functions to expel from the apparatus used air drawn from the conduit 52, as the piston moves up in the cylinder 4 and forces the used air into the conduit 52, through the port 5 of the cylinder.

During the rubber removing period, the intake port 80 of the air valve 40 is in registry with the conduit 52, through which air has been passed to the cylinder 4 through the port 5 at a point adjacent the top thereof, in order to move the piston down in the cylinder for forcible contact with the worn rubber. When the solenoid 44 of the air valve 40 is energized, through functioning of the limit switch 55 or of the emergency switch 49, in a manner hereinafter to be explained, the intake port of the air valve 40 is rotated counterclockwise, out of registry with the conduit 52 and into registry with the conduit 51, thereby admitting air into the cylinder 4 through the port 6 at a point below the limit of downward travel of the piston in the cylinder, the air being passed to the cylinder through the conduit 41, connected to the air source 7 and to the valve 40.

After the piston has been returned to its initial position adjacent the top of the cylinder, by the admission of air below the piston, in the manner explained above, the intake port 80 of the air valve 40 is in registry with the conduit 51, where it remains until again rotated in a clockwise direction into registry with the conduit 52, by manual pressure on the starter button of the switch 48, as another cycle is started by the energizing of the solenoid 43.

After completion of the removal of the worn rubber from a track link, the limit switch 55 functions to return the piston to its original position adjacent the top of the cylinder 4, as a result of contact of the dog 86 on the guide rod 19 with the operating lever 84, which is a part of the switch 55, substantially at the end of the downward travel of the rod 19, as the piston moves down in the cylinder 4. The lever 84, when actuated by the dog 86 on the rod 19, closes a circuit 74 and 76 in the switch 55 to the solenoid 44, which has one of its sides connected to the point 74 of the switch 55 and its other side connected to the power source 62. By closing the circuit 74 and 76 the intake port of the air valve 40 is rotated counterclockwise into registry with the conduit 51 whereby air is admitted to the cylinder 4 through the port 6 at a point below the piston, thereby forcing the piston up in the cylinder, where it is held by pressure of the air beneath the piston until another cycle of operation is initiated through energizing of the solenoid 43 by pressure on the switch 48. The intake port of the air valve 40 remains in registry with the conduit 51 until solenoid 43 is again actuated by pressure on the switch 48, which again rotates the intake port 80 of the air valve 40 into registry with the conduit 52.

The operating lever 84 of the limit switch 55 is fulcrumed on the base 1, as at 87. Adjacent one end of the lever 84, and pivotally secured thereto, is a connecting rod 79 having a plate 77 fastened thereto adjacent one of the ends of the rod. To the other end of the connecting rod 79 is attached a second plate 82. When the lever 84 is actuated by the dog 86 on the rod 19 as it moves down through one of the bushings 21 during the functioning of the apparatus, the lever 84 is swung in a counterclockwise direction, with the result that the contact points 74 and 76 of the switch 55 are bridged by the plate 77, thereby closing the circuit to the air valve solenoid 44, which restores the piston to its starting position in the manner indicated above, and renders the apparatus inoperative. At the same time the circuit through the contact points 78 and 81 of the switch 55 is opened as the plate 82 is separated from the contact points as a result of the counterclockwise movement of the lever 84. This opens the circuit to the switch C on the timer at the point 81 on the switch 55, thereby shutting off the supply of gas and water by deenergizing the solenoids 70 and 42, as will more fully appear hereinafter. The plate 77 is withdrawn from contact with the points 74 and 76 by the action of the tension spring 85 when pressure on the lever 84 is released, as the rod 19 moves upward and elevates the dog 86, following the admission of air to the cylinder 4 through the port 6, in the manner described above. Through the action of the spring 85 the plate 82 again bridges the switch contact points 78 and 81 but the apparatus remains inoperative until it is again set in motion by pressure on the switch 48.

In the event of premature removal of rubber from a track link, the rod 19 moves through a bushing 21 and the dog 86 on the rod 19 thereby actuates the lever 84 for energizing of the solenoid 44, which returns the piston to substantially its initial position at the top of the cylinder, in the manner indicated above. Should an emergency develop during the functioning of the apparatus, manual pressure by the operator on the button of the switch 49 shuts off the supply of gas and water by opening the circuit through C on the timer 32. At the same time the solenoid 44 is energized by the switch 49, the point 66 of which is connected to the solenoid 44. The opposite point 65 of the switch 49 leads to the power source 62. Energizing of the solenoid 44 rotates the intake port 80 of the valve 40 counterclockwise into registry with the conduit 51, whereby the piston is forced up in the cylinder 4 in the manner described above. The manner in which the switch 49 functions to shut off the supply of gas and water will hereinafter be described.

When the solenoids 43 and 44 are energized, in the manner explained above, the rods 46 and 47 thereof remain in the position they assume relative to the solenoids following rotation of the valve 40, until one of the solenoids is again energized. For example, when air is flowing to the top of the cylinder through the conduit 52, following energizing of the solenoid 43, the intake port 80 of the valve 40 remains in registry with the conduit 52 until the solenoid 44 is energized. Similarly, when air is entering the bottom of the cylinder through the conduit 51, following the energizing of the solenoid 44, the intake port 80 of the valve 40 remains in registry with the conduit 51 until the solenoid 43 is again energized.

The solenoids 42 and 70, which respectively actuate the water and gas valves 39 and 31, thereby providing for the flow of water and gas through the valves, remain energized until the flow of current passing through the switch D on the timer 32 is stopped by the opening of the timer switch C, forming a part of the holding circuit AC of the timer, and which is in circuit with the switch D. The current stoppage is effected through disengagement of the bridge plate 82 of the limit switch 55 from the contact points 78 and 81 thereof through functioning of the switch lever 84, as described above, or the circuit may be opened by pressure on the emergency switch 49. The connection between A and C on the timer is broken at the instant the button of the switch 49 is pressed, one point 64 of which is connected to the power source 62, while the opposite point 65 of the starter button is connected to the contact point 78, which is in circuit with the contact point 81 of the switch 55 through the bridge plate 82. The contact point 81 also is in circuit with the switch C on the timer 32. From the foregoing it will be evident that when the button of the emergency switch 49 is pressed, the flow of current to the contact point 78 is stopped through the opening of the circuit thereto, and, since the point 78 is in circuit with the switch C of the timer through the point 81 and the bridge plate 82, the holding circuit AC on the timer is opened when the button of the switch 49 is depressed, whereby the supply of gas and water is cut off. After the deenergizing of the water and gas solenoids 42 and 70 respectively, the valves 31 and 39 are closed by conventional spring constructions. As shown in Fig. 2 the valves 31 and 39 are in closed position. The supply of water and gas also may be shut off by manual manipulation of the valves 69, and 91 and 92 respectively.

The method of removing worn rubber from a track link is illustrated in Fig. 5 and is as follows:

After the cycle of operation is started, the hot acetylene flame emitted from the gas jets 26 is projected into the ends of the tubes 27 of the track link 25, while the flame from the two supplementary jets 57 comes in contact with the links intermediate the ends of the tubes 27. By the application of suitable heat, the rubber is rendered soft and pliable and is then readily cut and pressed from the track link by the cutting and pressing action of the punch 9. The sharpened points 14 and the inner edges of the outer webs 11 and 13 of the punch 9 are adapted to cut the rubber encircling the tubes 27 for freeing it therefrom; the webs 11 and 13, by virtue of their spring metal construction being adapted to grip the rubber, which is pushed from the link through the space separating the link tubes 27, through pressure applied by the combined action of the webs 11, 12, and 13 of the punch 9, the central web sections 12 being adapted to exert relatively greater pressure against the rubber than are the outer webs 11 and 13. Any rubber which may have adhered to the punch 9 is removed by the strippers 50 as the punch is again elevated. Rubber separated from a link is deposited on the base 54 of the holder 22. When one link has been removed from the holder 22 and another inserted therein, the cycle may be repeated by merely pressing the switch 48.

Building of my apparatus does not involve substantial financial outlays, due to the simplicity of its construction, and it is economical to operate, since only relatively small quantities of gas, water and electricity are required to separate worn material from a body to which it has adhered. The device is easy to operate, requiring only momentary pressure on the starter switch to cause it to function. The use of my invention in shops handling work of the character described will result in the saving of many man hours and produce material reductions in operating expense because of elimination of the laborious time-consuming methods employing hand operated tools heretofore practiced in the art.

No doubt many alterations and modifications of the present invention will occur to those skilled in the art without departing from the spirit and scope thereof. Accordingly it is my desire to be limited herein only by the prior art and the appended claims.

I claim:

1. In an apparatus for removing adhesive material from an element to which such material is affixed, means for supporting such element, cutting means, means arranging said cutting means for the exertion of cutting force and pressure against the adhesive material for removing it from the element, heat-emitting means positioned in said apparatus adjacent said element-supporting means and including a jet, a fuel source, a fuel conduit connected at one end to said jet and at the other end to said fuel source, means for igniting said fuel and conveying the heat generated thereby to said material for loosening it from said element, means for cooling said jet comprising a cooling jacket adapted to receive coolant circulated therein, a first valve adapted to control the flow of fuel to said jet, a coolant source, a conduit connected at one end to said coolant source and at the other end to said jacket, a second valve having an intake port arranged for alignment with said coolant source and an exhaust port arranged for communication with said coolant conduit for the circulation of coolant in said jacket, means for actuating said cutting means including a fluid power source, a third valve connected to said fluid power source and adapted to regulate the flow of power therefrom, said third valve having an intake port arranged for connection to said fluid power source and an exhaust port adapted for connection to said fluid power conduit, a source of electrical energy, means actuated by said source of electrical energy for operating said three valves, and a timer connected to said three valves and arranged to effect their operation substantially simultaneously whereby said valves are alternately opened and closed at the beginning and at the end, respectively, of a predetermined time cycle set by said timer.

2. Apparatus for removing bonded material from a body coated with such material, comprising a holder adapted to support said body, means for applying heat to said material for loosening it prior to its removal from said body comprising a jet, means for supplying ignitible substances through said jet for projecting heat to said material, means for cooling said jet comprising a housing surrounding it and adapted to receive cooling fluid circulated therein, a first valve adapted to control the flow of ignitible substances to said jet, a second valve for controlling the flow of cooling fluid to said jet, a combination cutting and pressing member adapted to remove said bonded material from said body when brought into forcible contact therewith, fluid power means for driving said cutting and pressing member, a third valve constructed and arranged to regulate the supply of said fluid power for driving said cutting and pressing member, power control means for operating said three valves, and a timer operatively connected to said power control means and adapted to actuate said valves at such times as to render their operation substantially simultaneous.

3. A device for removing adhesive materials from bodies to which such materials are attached, comprising a combination cutting and pressing member adapted to remove said materials when brought into forcible contact therewith, means for holding said materials and said bodies, means including a source of fuel for heating said materials for first loosening them from said bodies, means for cooling said heating means, a first conduit adapted to carry fuel to said heating means, a second conduit for conveying fluid to said cooling means, valve means for regulating the supply of fuel and cooling fluid, fluid-pressure means for driving said cutting and pressing member into forcible contact with said materials, and second valve means for controlling the supply of fluid pressure to said fluid-pressure means.

4. Apparatus for removing bonded material from bodies to which such material is attached comprising a punch having a cutting surface and a pressing surface, said punch being adapted to remove said bonded material by forcible contact therewith, power means for bringing said punch into forcible contact with said material, a timer adapted to control the movement of said punch by regulating the power means therefor, means for returning said punch during the operation of said apparatus to its initial position should an emergency develop, said means including mechanism adapted to reverse the flow of power and to restore said punch to its starting position, said emergency means being constructed and arranged to be set in operation by manual pressure thereon.

5. Apparatus for removing an adhesive shoe from a track link comprising a combination cutting and pressing member constructed and arranged for forcible contact with said shoe, means for conveying heat to said shoe for loosening it relative to said link prior to its removal therefrom, a housing surrounding said heat-conveying means and adapted to receive a cooling fluid circulated therein, fluid-pressure means adapted to drive said cutting and pressing member into forcible contact with said shoe, means for supplying fuel to said heat-conveying means, a first valve means constructed and arranged to control the flow of fuel to said heating means and cooling fluid therefor, and a second valve means adapted to regulate the supply of said fluid pressure for said piston whereby said cutting and pressing member is driven substantially simultaneously with the subjection of said shoe to heat and the circulation of cooling fluid in said housing.

6. In combination, in an apparatus adapted to remove adhesive materials from bodies to which such materials are attached, means for subjecting said materials to heat for loosening them relative to said bodies before their removal therefrom, a combination cutting and pressing member adapted to remove said materials from said bodies by forcible contact therewith, a source of electrical energy, electrical means connected to said source of electrical energy for controlling said cutting and pressing member, means for cooling said heating means, a plurality of valves adapted to control the supply of fuel and cooling fluid for said heating means and the flow of power for driving said cutting and pressing member, and a timer operatively connected to said valve means, and to said source of electrical energy for effecting operation of said valves substantially simultaneously.

7. In a device for removing adhesive materials from supporting bodies by the combination of heat, pressure and cutting power, heating means, cutting means, pressure means, cooling fluid for said heating means, a plurality of valves constructed and arranged to function substantially simultaneously for controlling the flow of said heat and cooling fluid, a timer for effecting substantially simultaneous coaction of said valves, and power means for operating said timer and said valves, said timer and said valves being adapted to effect removal of said adhesive materials from said bodies substantially at the end of a cycle predetermined by said timer.

8. Apparatus for removing adhesive material from bodies to which such material is affixed, comprising a cutting and pressing member adapted to forcibly contact said material for removing it from said bodies, means for driving said cutting and pressing member, a holder for said cutting and pressing member, a rod projecting from one side of said holder, a timer adapted to control said driving means for said cutting and pressing member and the removal of said material from said body by means of an operating cycle set by said timer, stop means for limiting the movement of said cutting and pressing member whereby it is returned to its initial position and held static when said stop means are actuated by said rod, said rod being positioned on said holder in such a manner that it is adapted to gravitate to actuate said stop means should said material be removed from said body prior to the expiration of said operating cycle.

9. In a device of the class described including a supporting element for materials to be removed therefrom, means for first heating said materials for loosening them relative to said element comprising a jet positioned to communicate heat to said materials, means for cooling said jet, a material removing member including a punch adapted to exert cutting force and pressure against said materials for separating them from said element, and means for driving said punch and bringing it into forcible contact with said materials.

10. In combination, mechanism adapted to remove adhesive materials from supporting bodies comprising a holder constructed and arranged to retain said bodies and materials, means for first subjecting said materials to heat for loosening them relative to said bodies, and including a jet adapted to communicate heat to said materials and bodies, means for cooling said jet including at least one jacket surrounding said jet and adapted to receive cooling fluid circulated therein, a removing member adapted to exert cutting force and pressure against said materials, and means for driving said removing member.

11. In a device adapted to remove adhesive materials from bodies to which such materials are attached by means of a combination of cutting force and pressure applied thereto by a punch, automatic means for controlling the operation of said punch comprising a power source adapted to drive said punch, a timer constructed and arranged to render said punch inoperative substantially at the conclusion of a cycle predetermined by said timer, and valve means for regulating the flow of said power and for driving said punch.

12. Apparatus for removing bonded materials from bodies to which attached, comprising a cutting member adapted to exert pressure against said materials for removing them from said bodies, means for heating said materials prior to their removal from said bodies, structure adapted to receive fluid circulated therein for cooling said heating means, and means for bringing said cutting and pressing member into forcible contact with said materials whereby they are cut and pressed from said supporting bodies.

13. Apparatus for removing adhesive materials from structure to which such materials are affixed, comprising means for first subjecting said materials to heat for loosening them relative to said structure, a punch adapted to exert cutting force and pressure against said materials for removing them from said structure after they have been loosened relative thereto, and means for driving said punch.

WALTER W. RANSOM.

REFERENCES CITED

The following references are of record in the file of this patent:

UNITED STATES PATENTS

| Number | Name | Date |
| --- | --- | --- |
| 1,311,540 | Thomas | July 29, 1919 |
| 2,291,862 | Bailey | Aug. 4, 1942 |
| 2,327,028 | Dohrmwend | Aug. 17, 1943 |